United States Patent [19]

Inoue et al.

[11] Patent Number: 4,845,146

[45] Date of Patent: Jul. 4, 1989

[54] FLAME-RETARDANT OLEFIN POLYMER COMPOSITION

[75] Inventors: Takashi Inoue; Masazi Sunada; Motohide Okamoto; Masayoshi Kariya, all of Yokohama; Tadashi Inoh, Kawasaki, all of Japan

[73] Assignee: Nippon Petrochemicals Company, Limited, Tokyo, Japan

[21] Appl. No.: 183,487

[22] Filed: Apr. 8, 1988

Related U.S. Application Data

[63] Continuation of Ser. No. 881,128, Jul. 2, 1986, abandoned.

[30] Foreign Application Priority Data

Jul. 9, 1985 [JP] Japan ................................ 60-149211
Mar. 28, 1986 [JP] Japan .................................. 61-68745

[51] Int. Cl.$^4$ ................................................ C08K 3/22
[52] U.S. Cl. ..................................... 524/436; 524/80; 524/74; 524/193; 524/437
[58] Field of Search .................. 117/110 PM; 525/74, 525/193; 524/437, 80, 436

[56] References Cited

U.S. PATENT DOCUMENTS

| | | | |
|---|---|---|---|
| 3,816,367 | 6/1974 | Larkin et al. | 106/15 |
| 3,832,326 | 8/1974 | North et al. | 524/264 |
| 3,912,671 | 10/1975 | Kando et al. | 260/45.7 |
| 3,953,565 | 4/1976 | Mizutani et al. | 264/210 |
| 4,012,343 | 3/1977 | Raley | 524/80 |
| 4,067,847 | 1/1978 | Yui et al. | 260/45.7 |
| 4,071,494 | 1/1978 | Gaylord | 525/193 |
| 4,087,588 | 5/1978 | Shida et al. | 525/74 |
| 4,188,313 | 2/1980 | Cerney et al. | 524/80 |
| 4,352,817 | 10/1982 | Nakae et al. | 524/437 |
| 4,396,730 | 8/1983 | Imahashi | 524/436 |
| 4,430,470 | 2/1984 | Taniguchi et al. | 524/269 |
| 4,514,539 | 4/1985 | Hattrich et al. | 524/437 |

Primary Examiner—Veronica P. Hoke
Attorney, Agent, or Firm—Dilworth & Barrese

[57] ABSTRACT

A flame-retardant olefin polymer composition containing 100 parts by weight of a resin component, said resin component consisting essentially of the following (a) and (b):

(a) 60-99% by weight of a copolymer of ethylene and a carboxyl-containing monomer or a derivative thereof and (b) 1-40% by weight of an olefin polymer modified with an unsaturated carboxylic acid or a derivative thereof; and (c) 20-200 parts by weight of an inorganic flame retardant.

19 Claims, No Drawings

FLAME-RETARDANT OLEFIN POLYMER COMPOSITION

This is a continuation of application Ser. No. 881,128 filed on Jul. 2, 1986, now abandoned.

BACKGROUND OF THE INVENTION

The present invention relates to a flame-retardant olefin polymer composition superior in heat resistance and mechanical strength, the olefin polymer composition consisting principally of a copolymer of ethylene and a carboxyl-containing monomer or a derivative thereof and an olefin polymer modified with an unsaturated carboxylic acid or a derivatve thereof.

Polyethylenes are general-purpose resins in greatest demand which are superior in physical and chemical properties and so formed into films, sheets, pipes, containers, etc. according to various methods, including extrusion, injection molding and rotational molding, and are applied to various domestic and industrial applications.

Since those polyethylenes are easy to burn, various methods have heretofore been proposed for rendering them flame-retardant. Among them, the most general method is to add a flame retardant containing halogen or phosphorus to the polyethylenes. The degree of flame retardance increases with increase in the amount of the flame retardant added. However, the increase in the amount of the flame retardant used not only causes deterioration of the mechanical strength and processability but also impairs the flexibility and cold resistance markedly. Further, from the standpoint of fire prevention, conventional flame-retardant compositions are required to be rendered highly flame-retardant and in some regions there is the recent tendency that such high degree of flame retardancy is obligated. Under the circumstances, inorganic flame retardants such as magnesium hydroxide and aluminum hydroxide, which do not evolve a noxious gas during combustion and are low smoking and pollution-free, meet the above needs and are rapidly increasing in demand. (Related techniques are disclosed, for example, in Japanese Patent Laid Open Nos. 132254/1976, 136832/1981 and 13832/1985.)

In the conventional commercial polyethylenes, the acceptability of inorganic flame retardants is poor and the flame retarding effect is low. Besides, with increase in the amount of loading, the mechanical strength as well as flexibility and processability deteriorate to an impractical extent.

On the other hand, the use of non-rigid plastics such as ethylene-vinyl acetate copolymer, ethylene-ethyl acrylate copolymer, chlorinated polyethylene, or ethylene-propylene copolymer rubber, is well known for increasing the percentage loading of such inorganic flame retardants. But it is inferior in point of mechanical strength and heat resistance.

SUMMARY OF THE INVENTION

It is an object of the present invention to provide a low smoking, pollution-free, more highly flame-retardant composition which neither deteriorates in mechanical strength such as tensile strength and elongation or in processability nor markedly impairs its heat resistance, flexibility and cold resistance even at a high percentage loading of an inorganic flame retardant, or a self-extinguishing flame-retardant composition having a high flame retardance conforming to the UL-94 V-1 or V-0 rating.

It is another object of the present invention to provide products obtained by using the above flame-retardant composition; for example, electrical materials such as insulator or sheath for electric wire or power cable, as well as insulation protectors such as cable protecting cover, packing, sealing material, insulation coating, insulating sheet or film, and pipes such as flexible pipes and protective pipes, and also injection-molded products and master batches.

The present invention resides in a flame-retardant olefin polymer composition containing 100 parts by weight of a resin component, the resin component consisting essentially of (a) 60–99% by weight of a copolymer of ethylene and a carboxyl-containing monomer or a derivative thereof and (b) 1–40% by weight of an olefin polymer modified with an unsaturated carboxylic acid or a derivative thereof, and (c) 20–200 parts by weight of an inorganic flame retardant.

The present invention further resides in electrical materials obtained by using the above composition such as, for example, electric wire and cable.

DETAILED DESCRIPTION OF THE INVENTION

Examples of the copolymer of ethylene and a carboxyl-containing monomer or a derivative thereof as component (a) in the composition of the present invention include ethylene-acrylic acid copolymer, ethylene-methacrylic acid copolymer, ethylene-methyl acrylate copolymer, ethylene-methyl methacrylate copolymer, ethylene-ethyl acrylate copolymer, ethylene-ethyl methacrylate copolymer, ethylene-glycidyl methacrylate copolymer, ethylene-maleic anhydride copolymer, and metallic salts thereof (e.g. ionomer resin). As a further example there is mentioned ethylene-vinyl acetate copolymer. In the case of using an inorganic flame retardant, it is desirable that the content of the carboxyl group be in the range of 5 to 30 wt. %, more preferably 10 to 25 wt. %.

If the carboxyl group content is less than 5 wt. %, there is a fear that the acceptability of the inorganic flame retardant will be poor and the resulting product will become fragile, causing deterioration of mechanical strength, and a carboxyl group content exceeding 30 wt. % may result in deterioration of heat resistance.

Among those exemplified above, ethylene-ethyl acrylate copolymer and ethylene-vinyl acetate copolymer are particularly preferred.

It is desirable that the melt index (hereinafter referred to simply as "MI") of the copolymer be in the range of 0.1 to 10 g, more preferably 0.3 to 5 g, per 10 minutes. At an MI value smaller than 0.1 g/10 min and that exceeding 10 g/10 min, there is a fear of deterioration in processability and mechanical strength, respectively.

The olefin polymer modified with an unsaturated carboxylic acid or a derivative thereof, as component (b) in the present invention, is obtained by adding 0.05 to 10 wt. % of the unsaturated carboxylic acid or the derivative thereof to the olefin polymer in the presence of an organic peroxide to modify the olefin polymer, or by mixing the modified product into an unmodified olefin polymer.

Examples of the olefin polymer are olefin homopolymers such as polyethylene, polypropylene, polybutene-1 and poly-4-methyl-pentene-1, intercopolymers of ethylene, propylene, butene-1, 4-methyl-pentene-1, hexene-1 and octene-1, as well as copolymers of ethylene with vinyl esters, unsaturated carboxylic acids or unsaturated carboxylic esters. As preferred examples are mentioned polyethylene, polypropylene and copolymers of ethylene and other α-olefins such as ethylene-butene-1 copolymer, more preferably, ethylene homopolymers or ethylene-α-olefin copolymers ranging in density from 0.88 to 0.97 g/cm$^3$, as well as mixtures thereof.

In the present invention, moreover, the following materials may be used together with the olefin polymer: solid rubbers such as polyisobutylene, butyl rubber, ethylene-propylene rubber, ethylene-propylene-diene rubber, styrene-butadiene rubber, polybutadiene rubber, chloroprene rubber, urethane rubber, ethylene-vinyl acetate copolymer rubber and natural rubber, liquid rubbers such as liquid polybutadiene, as well as mixtures of these synthetic and natural rubbers.

As examples of the unsaturated carboxylic acid are mentioned mono- and dibasic acids such as acrylic, methacrylic, maleic, fumaric, crotonic, itaconic and citraconic acids.

As examples of the derivative of the unsaturated carboxylic acid are mentioned metallic salts, amides, imides, esters and anhydrides of the unsaturated carboxylic acids exemplified above, with maleic anhydride being most preferred.

The olefin polymer is modified by adding thereto the unsaturated carboxylic acid or the derivative thereof (hereinafter referred to simply as the "unsaturated carboxylic acid") in an amount in the range of 0.05 to 10 wt. %, preferably 0.1 to 5 wt. %, and allowing a heat reaction to take place in the presence of an organic peroxide.

How to perform the above reaction is not specially limited; for example, the reaction may be conducted by melt-mixing the components in the absence of a solvent within an extruder or a kneader such as a Bumbury's mixer, or it may be conducted by heat-mixing the components in a solvent such as an aromatic hydrocarbon, e.g. benzene, xylene or toluene, or an aliphatic hydrocarbon such as hexane, heptane or octane. Preferably, the reaction is carried out within an extruder because of simple operation and superior economy.

If the amount of the unsaturated carboxylic acid exceeds 10 wt. %, it is possible that decomposition and crosslinking reaction will take place in addition to the addition reaction. And in an amount thereof less than 0.05 wt. % it will be impossible to attain the effect of the present invention.

Suitable examples of the organic peroxide are benzoyl peroxide, lauryl peroxide, azobisisobutyronitrile, dicumyl peroxide, t-butyl hydroperoxide, α,α'-bis(t-butylperoxydiisopropyl)benzene, di-t-butyl peroxide, and 2,5-di(t-butylperoxy)hexyne. The organic peroxide is used in an amount in the range of 0.005 to 2.0, preferably 0.01 to 1, part by weight per 100 parts by weight of the olefin polymer. If the amount of the organic peroxide added is less than 0.005 part by weight, the effect of modification will not substantially be exhibited. And even if the organic peroxide is added in an amount exceeding 2 parts by weight, not only it is difficult to obtain a further effect but also there arises a likelihood of an excessive decomposition or crosslinking reaction.

The reaction temperature is determined suitably in consideration of usual temperature conditions such as deterioration of the resin, decomposition of the unsaturated carboxylic acid and the decomposition temperature of the organic peroxide. Generally, it is in the range of 150° to 300° C.

The modified olefin polymer in the present invention may be further mixed with unmodified olefin polymer or unmodified rubber. The mixing ratio of the modified olefin polymer and the unmodified olefin polymer is not specially limited, but preferably it is in the range of 1:99 to 50:50, more preferably 10:90 to 45:55.

In the present invention, the amount of component (b) is in the range of 1 to 40 wt. %, preferably 2 to 20 wt. %, based on the amount of component (a). If the amount of component (b) is less than 1 wt. %, there will be little improvement in tensile strength, and if it exceeds 40 wt. %, there will be a marked deterioration of elongation.

As examples of the inorganic flame retardant used as component (c) in the present invention, there are mentioned hydrates of inorganic metallic compounds such as aluminum hydroxide, magnesium hydroxide, zirconium hydroxide, basic magnesium carbonate, dolomite, hydrotalcite, calcium hydroxide, barium hydroxide, hydrate of tin oxide, and borax, as well as zinc borate, zinc metaborate, barium metaborate, zinc carbonate, calcium magnesium carbonate, calcium carbonate, barium carbonate, magnesium oxide, molybdenum oxide, zirconium oxide, tin oxide, and red phosphorus. These may be used alone or in combination of two or more. Above all, at least one member selected from the group consisting of magnesium hydroxide, aluminum hydroxide, basic magnesium carbonate and hydrotalcite is preferably employed because superior flame retarding effect and economical advantage. The particle size of the flame retardant varies depending on the kind thereof, but in the cases of magnesium hydroxide and aluminum hydroxide, an average particle size is preferably not larger than 20μ, more preferably in the range of 0.3 to 5μ.

The amount of the inorganic flame retardant is in the range of 20 to 200, preferably 40 to 150, parts by weight per 100 parts by weight of the resin. If it is less than 20 parts by weight, there will not be attained a sufficient flame retarding effect, and an amount thereof exceeding 200 parts by weight will result in deterioration of mechanical strength and elongation, loss of flexibility, a fragile property and deteriorated low-temperature characteristics.

For obtaining a composition having a high degree of flame retardance conforming to the UL-94 V-1 or V-0 rating, namely, a self-extinguishing flame-retardant composition, it is desirable to use an organic flame retardant comprising a halogen-based compound and a flame retarding aid comprising antimony trioxide or pentoxide, as component (d), in addition to the resin component and the inorganic flame retardant. The organic flame retardant and the flame retarding aid are added at a weight ratio in the range of 5:1 to 1:3 and in a total amount of both up to 100 parts by weight.

As the organic flame retardant comprising a halogen-based compound as component (d) there may be used a chlorine- or bromine-based flame retardant, and as the flame retarding aid there is used antimony trioxide or pentoxide.

It is necessary that the organic flame retardant and the flame retarding aid be used together. An outstanding flame-retardant effect is exhibited at an organic flame retardant : flame retarding aid weight ratio of 1~5:1~3, preferably 1~3:1.

The total amount of the organic flame retardant and flame retarding aid is up to 100 parts by weight, particularly in the range of 20 to 50 parts by weight, based on the amount of the components (a), (b) and (c).

As examples of the halogen-based flame retardant used as component (d) in the present invention there are mentioned bromine-based ones such as tetrabromobisphenol (TBA), hexabromobenzene, decabromodiphenyl ether, tetrabromoethane (TBE), tetrabromobutane (TBB) and hexabromocyclodecane (HBCD), as well as chlorine-based ones such as chlorinated paraffin, chlorinated polyphenyl, chlorinated polyethylene, chlorinated diphenyl, perchloropentacyclodecane and chlorinated naphthalene. A combined use thereof with antimony trioxide will exhibit a more outstanding effect.

Further, a phosphorus-based flame retardant may be used together with the halogen-based flame retardant. As examples of the phosphorus-based flame retardant are mentioned mainly phosphoric esters and halogenated phosphoric esters such as tricresyl phosphate, tri($\beta$-chloroethyl)phosphate, tri(dichloropropyl)phosphate, tri(dibromopropyl)phosphate, and 2,3-dibromopropyl-2,3-chloropropyl phosphate.

The composition of the present invention is a flame-retardant composition superior in mechanical strength and heat resistance, containing 100 parts by weight of the resin component consisting of (a) 60-99 wt. % of the copolymer of ethylene and the carboxyl-containing monomer or derivative thereof and (b) 1-40 wt. % of the olefin polymer modified with the unsaturated carboxylic acid or derivative thereof, and (c) 20-200 parts by weight of the inorganic flame retardant. Preferably, the component (a) as an oxygen-containing resin is combined with the inorganic flame retardant, whereby it is possible to increase the acceptability of the flame retardant and enhance a synergistic flame-retardant effect. Further, the addition of the olefin polymer modified with the unsaturated carboxylic acid or derivative thereof as component (b) in an appropriate amount will allow the component (b) to exhibit a coupling agent-like effect with respect to the components (a), (c) and (d), enhance a mutual compatibility and greatly improve the mechanical strength.

For use as an electrical material such as an insulator or sheath for electric wire or cable for which is required a higher heat resistance, that is, a small percent heat deformation, it is desirable to use an ethylene-$\alpha$-olefin copolymer of a relatively high density. Further, by using inorganic fillers together with the flame retardant, the amount of the flame retardant used can be reduced and it is possible to impart other characteristics thereto.

Inorganic fillers used as an optional component in the present invention are in the form of powder, plate, scale, needle, sphere, hollow material, or fiber. Examples are powdered fillers such as calcium sulfate, calcium silicate, clay, diatomaceous earth, talc, alumina, siliceous sand, glass powder, iron oxide, metal powder, graphite, silicon carbide, silicon nitride, silica, boron nitride, aluminum nitride and carbon black; fillers in the form of metallic foil, plate or scale such as mica, glass plate, sericite, pyrophyllite, aluminum flake and graphite; hollow fillers such as Shirasu balloon, metal balloon, glass balloon and pumice; as well as glass fiber, carbon fiber, graphite fiber, whisker, metallic fiber, silicon-carbide fiber, and mineral fibers such as asbestos and wollastonite.

The amount of the inorganic fillers used is up to about 100 parts by weight per 100 parts by weight of the composition of the present invention. An amount thereof exceeding 100 parts by weight is not desirable because of deterioration in mechanical strength such as the impact strength of molded products.

In the case of using the inorganic flame retardant or inorganic filler in the present invention, it is desirable that the surface of the inorganic material be subjected to a surface treatment such as coating with a fatty acid, e.g. stearic, oleic or palmitic acid, or a metallic salt thereof, paraffin, wax, polyethylene wax, or a modified material thereof, an organosilane, organoborane or organotitanate.

The composition of the present invention is melt-kneaded in a conventional kneading machine such as Bumbury's mixer, pressure kneader, kneader/extruder, biaxial extruder, or roll, together with the specific ethylene-$\alpha$-olefin copolymer and flame retardant and, if desired, further together with inorganic fillers and additives, whereby it is pelletized. Thus, it is used as a molded product or a master batch. Alternatively, the resin component may be dry-blended with the flame retardant, additives, etc.

Other synthetic resins, antioxidant, lubricant, organic and inorganic pigments, as well as such additives as ultraviolet inhibitor, dispersant, copper de-activator, neutralizer, foaming agent, plasticizer, anti-foaming agent, crosslinking agent, flow improver, weld strength improver and nucleating agent, may be added as long as they do not badly impairs the effect of the present invention.

EXAMPLE (Resins Used)

Component (a) (Copolymer of ethylene and carboxyl-containing monomer)

| | |
|---|---|
| (a-1) | Ethylene-ethyl acrylate copolymer (Ethyl acrylate content (EA) = 10 wt. %, melt index (MI) = 0.5 g/10 min) |
| (a-2) | Ethylene-ethyl acrylate copolymer (Ethyl acrylate content (EA) = 10 wt. %, melt index (MI) = 0.5 g/10 min) (EA content - 15 wt. %, MI = 0.8 g/10 min) |
| (a-3) | Ethylene-ethyl acrylate copolymer (Ethyl acrylate content (EA) = 10 wt. %, melt index (MI) = 0.5 g/10 min) (EA content = 20 wt. %, MI = 1.5 g/10 min) |
| (a-4) | Ethylene-ethyl acrylate copolymer (Ethyl acrylate content (EA) = 10 wt. %, melt index (MI) = 0.5 g/10 min) (EA content = 15 wt. %, MI = 1.5 g/10 min) |
| (a-5) | Ethylene-ethyl acrylate copolymer (Ethyl acrylate content (EA) = 10 wt. %, melt index (MI) = 0.5 g/10 min) (EA content = 15 wt. %, MI = 3.0 g/10 min) |
| (a-6) | Ethylene-ethyl acrylate copolymer (Ethyl acrylate content (EA) = 10 wt. %, melt index (MI) = 0.5 g/10 min) (EA content = 15 wt. %, MI = 6.0 g/10 min) |
| (a-7) | Ethylene-vinyl acetate copolymer (Vinyl acetate content = 15 wt. %, MI = 1.4 g/10 min) (trade name: P1403, a product of Mitsui Du Pont Polychemicals Co., Ltd.) |

Component (b) (Olefin polymer modified with unsaturated carboxylic acid or derivative thereof)

(b-1) Ethylene-butene-1 copolymer (Density (d)=0.935 g/cm$^3$, MI=0.8 g/10 min) (a product of Nippon Petrochemicals Co., Ltd.)

(b-2) Ethylene-butene-1 copolymer (d=0.922 g/cm$^3$, MI=1.0 g/10 min) (a product of Nippon Petrochemicals Co., Ltd.)

(b-3) Ethylene-butene-1 copolymer (d=0.956 g/cm$^3$, MI=1.6 g/10 min) (a product of Nippon Petrochemicals Co., Ltd.)

The above three kinds of ethylene-α-olefin copolymers (b-1), (b-2) and (b-3) were each melt-kneaded in a 50 mm dia. (screw diameter) extruder at 230° C. together with 0.25 wt. % of maleic anhydride and 0.02 wt. % of organic peroxide (trade name: Perhexyne 25B, a product of Nippon Oils And Fats Co., Ltd.) to obtain modified ethylene-α-olefin copolymers with 0.15 wt. % maleic anhydride added. The thus-modified copolymers were found to have MI values of 0.3 g/10 min (b-1'), 0.4 g/10 min (b-2') and 0.6 g/10 min (b-3').

Component (c) (Inorganic flame retardant)

(c-1) Magnesium hydroxide, Mg(OH)$_2$ (trade name: Kisuma 5B, a product of Kyowa Kagaku K.K.)

(c-2) Aluminum hydroxide, Al(OH)$_3$ (trade name: Higilite H-42M, a product of Nippon Light Metal Company, Ltd.)

(c-3) Talc (trade name: Talc 13R product of Asada Seifun K.K.)

(c-4) Calcium carbonate, CaCO$_3$ (trade name: Calcium Carbonate #1010, a product of Nitto Funka K.K.)

Component (d) (Halogen-based organic flame retardant)

(d-1) Derivative of tetrabromobisphenol A (trade name: Fire Guard 3003, a product of Teijin Chemical Co., Ltd.)

(d-2) Derivative of tetrabromobisphenol A (trade name: Fire Guard 3100, a product of Teijin Chemicals Co., Ltd.)

Flame retarding assistant: Antimony trioxide

Examples 1–11 and Comparative Examples 1–6

Predetermined amounts of inorganic flame retardants were added to 100 parts of resin components comprising predetermined amounts of the above components (a) and (b). Results of evaluation on physical properties are as set out in Table 1. It is seen that the compositions obtained in Examples 1 to 11 which are within the scope of the present invention are well-balanced in both mechanical strength such as tensile strength and elongation and percent heat deformation, do not lose flexibility and have a high oxygen index.

On the other hand, Comparative Example 1 did not use the modified olefin polymer as component (b) in the invention; the resulting composition was inferior in both mechanical strength such as tensile strength and elongation and percent heat deformation.

Comparative Example 2 used unmodified component (b) and the composition obtained was inferior in mechanical strength and percent heat deformation like Comparative Example 1.

Comparative Examples 3 and 4 used component (b) outside the scope of the present invention, but the products obtained were not well balanced in mechanical strength and percent heat deformation.

Comparative Example 5 and 6 deviated in the amount of inorganic flame retardant used from the scope of the present invention. The products obtained are inferior in either flame retardance (Comparative Example 5) or mechanical strength (Comparative Example 6).

Examples 12 and 13

Unmodified ethylene-α-olefin copolymer of a relatively high density was added to resin components comprising predetermined amounts of components (a) and (b), and a predetermined amount of inorganic flame retardant was incorporated therein. The influence of the use of the relatively high density ethylene-α-olefin copolymer was observed. Table 2 shows results, from which it is seen that the percent heat deformation (heat resistance) could be improved without loss of mechanical strength and flexibility.

Examples 14–19 and Comparative Examples 7–14

UL-94 test was made with respect to a higher flame retardance (self-extinguishing property). Predetermined amounts of halogen-based flame retardants and flame retarding aids were incorporated in predetermined amounts of the components (a), (b) and (c), and the products obtained were evaluated for mechanical strength and flame retardancy. Results are as set out in Table 3.

As seen in Examples 14–19, where halogen-based flame retardant and flame retarding aid are in the range of 5:1 to 1:3, the V-0 rating in the UL-94 test is satisfied without fire dripping, and the compositions obtained are all well balanced and superior in mechanical strength such as tensile strength and elongation.

Comparative Example 7 did not use the component (b) of the present invention; as a result, there occurred fire dripping, not satisfying the V-1 rating.

Comparative Example 8 used the component (b) of the present invention but in an amount of 45 wt. % outside the scope of the present invention. Both tensile strength and elongation were poor.

In Comparative Examples 9 and 10 there were used ratios of halogen-based flame retardant and flame retarding aid outside the range of 5:1 to 1:3; as a result, the UL-94 V-1 rating was not satisfied.

In Comparative Examples 11 and 12 there were used inorganic flame retardants outside the scope of the present invention. Either the UL-94 V-1 rating was not satisfied or the tensile strength and elongation deteriorated.

In Comparative Examples 13 and 14 there were used talc and calcium carbonate, respectively, as inorganic flame retardants. Mechanical strength deteriorated and the UL-94 V-1 rating was not satisfied.

Example 20

Tests were conducted for conforming to the product specifications of JIS C 3604, 3605 and 3606 for use as an electrical material, more particularly, as an insulator or sheath for polyethylene cable.

(1) JIS C 3604-1971 (Polyethylene Insulated Cable)

(2) JIS C 3605-1981 (600V Polyethylene Insulated Cable and 600V Crosslinked Polyethylene Insulated Cable)

(3) JIS C 3606-1981 (High-Voltage Crosslinked Polyethylene Insulated Cable)

The following is an example of the product specifications of JIS C 3604, 3605 and 3606.

Extract from JIS C 3604, 3605, 3606 product specifications

| Item | Patent |
|---|---|
| Tensile strength | 1.0 kgf/mm$^2$ {9.8 MPa} or more |

-continued

| Item | Patent |
|------|--------|
| Elongation | 350% or more |

Predetermined amounts of components (a), (b), (c), (d) and (e) were mixed and the resulting compositions were evaluated for tensile strength and elongation (according to JIS C 3005) as insulators or sheaths for polyethylene cable. Results are as set out in Table 4, from which it is seen that sample Nos.3 and 6 cannot satisfy the product specifications of JIS C 3604 to 3606 in point of tensile strength and that therefore as an electrical material, more particularly, as an insulator or sheath for polyethylene cable, it is desirable for the copolymer of ethylene and carboxyl-containing monomer as component (a) to have a melt index not larger than 5 g/10 min.

The testing methods adopted are as follows.

<Testing Method>

1. Tensile Strength and Elongation

No.3 dumbbell specimen from a 1 mm thick sheet was measured for tensile strength and elongation at a pulling rate of 200 mm/min by the use of a Tensilon.

2. Heat Resistance (Percent Heat Deformation)

A column having a thickness of 6 mm and a diameter of 10 mm was pressed at a load of 2.64 kg in an oil bath held at 100° C., and a percent deformation after 30 minutes was obtained.

3. Oxygen Index (O.I) ... D. 2863 - A.S.T.M $$O.I = \frac{\text{Oxygen flow rate}}{\text{Oxygen flow rate} + \text{Nitrogen flow rate}} \times 100$$

Minimum oxygen concentration required for a sample to burn consecutively for 3 minutes or more, or for a continuous burning length of 50 mm or more.

4. Flame Retardance (according to the UL-94 test)

A specimen having a length of 127 mm, a width of 127 mm and a thickness of 1.6 mm (nominal 1/16″) is contacted with flame for 10 seconds, then taken out and measured for burning and red heat times.

(i) V-0 Rating

Average self-extinguishing time is not longer than 5 seconds, maximum self-extinguishing time not longer than 10 seconds, and cotton does not ignite with fire drip.

(ii) V-1 Rating

Average self-extinguishing time is not longer than 25 seconds, maximum self-extinguishing time not longer than 30 seconds, and cotton located 12 inches under a specimen does not ignite with fire drip.

TABLE 1

| Physical Properties Evaluation Example | Copolymer of ethylene and carboxyl-containing monomer or derivative thereof | | | | Modified olefin polymer | | | | Inorganic Flame Retardant | | Tensile Strength (kg/mm²) Elongation (%) | Percent Heat Deformation (%) | Oxygen Index |
|---|---|---|---|---|---|---|---|---|---|---|---|---|---|
| | Kind | MI (g. 10 min) | Melting Point (°C.) | Amount (wt. %) | Kind | MI (g. 10 min) | Density (g/cm³) | Amount (wt. %) | Kind | (wt. part) | | | |
| Example 1 | a-1 | 0.5 | 104 | 95 | b-1′ | 0.3 | 0.935 | 5 | c-1 | 100 | 1.50/720 | 20 | 27 |
| Example 2 | a-1 | 0.5 | 104 | 90 | b-1′ | 0.3 | 0.935 | 10 | c-1 | 100 | 1.68/710 | 18 | 27 |
| Example 3 | a-1 | 0.5 | 104 | 80 | b-1′ | 0.3 | 0.935 | 20 | c-1 | 100 | 1.56/690 | 10 | 26 |
| Example 4 | a-2 | 0.8 | 100 | 80 | b-1′ | 0.3 | 0.935 | 20 | c-1 | 100 | 1.42/640 | 13 | 27 |
| Example 5 | a-2 | 0.8 | 100 | 80 | b-1′ | 0.3 | 0.935 | 20 | c-1 | 120 | 1.15/610 | 10 | 29 |
| Example 6 | a-2 | 0.8 | 100 | 70 | b-1′ | 0.3 | 0.935 | 30 | c-1 | 100 | 1.18/600 | 8 | 26 |
| Example 7 | a-3 | 1.5 | 96 | 80 | b-1′ | 0.3 | 0.935 | 20 | c-1 | 100 | 1.16/600 | 19 | 27 |
| Example 8 | a-1 | 0.5 | 104 | 80 | b-2′ | 0.4 | 0.922 | 20 | c-1 | 100 | 1.63/730 | 12 | 27 |
| Example 9 | a-2 | 0.8 | 100 | 80 | b-3′ | 0.6 | 0.956 | 20 | c-1 | 100 | 1.31/630 | 9 | 27 |
| Example 10 | a-7 | 1.4 | 91 | 70 | b-1′ | 0.3 | 0.935 | 30 | c-1 | 100 | 1.26/630 | 18 | 27 |
| Example 11 | a-2 | 0.8 | 100 | 80 | b-1′ | 0.3 | 0.935 | 20 | c-2 | 130 | 1.40/660 | 13 | 28 |
| Comparative | | | | | | | | | | | | | |
| Example 1 | a-2 | 0.8 | 100 | 100 | — | — | — | — | c-1 | 100 | 1.00/570 | >30 | 28 |
| Example 2 | a-2 | 0.8 | 100 | 80 | unmodified b-1 | 0.8 | 0.935 | 20 | c-1 | 100 | 1.05/550 | >30 | 27 |
| Example 3 | a-3 | 1.5 | 96 | 50 | b-1′ | 0.3 | 0.935 | 50 | c-1 | 100 | 0.83/380 | 4 | 26 |
| Example 4 | a-2 | 0.8 | 100 | 99.5 | b-1′ | 0.3 | 0.935 | 0.5 | c-1 | 100 | 1.05/580 | >30 | 28 |
| Example 5 | a-2 | 0.8 | 100 | 80 | b-1′ | 0.3 | 0.935 | 20 | c-1 | 15 | 2.13/840 | >30 | 18 |
| Example 6 | a-2 | 0.8 | 100 | 80 | b-1′ | 0.3 | 0.935 | 20 | c-1 | 210 | 0.62/40 | 11 | 35 |

TABLE 2

| Physical Properties Evaluation Example | Copolymer of ethylene and carboxyl-containing monomer or derivative therof | | | | Modified olefin polymer | | | | Ethylene-α-olefin copolymer | | | |
|---|---|---|---|---|---|---|---|---|---|---|---|---|
| | Kind | MI (g/10 min) | Melting Point (°C.) | Amount (wt. %) | Kind | MI (g/10 min) | Density (g/cm³) | Amount (wt. %) | Kind | MI (g/10 min) | Density (g/cm³) | Amount (wt. %) |
| Example 2 | a-1 | 0.5 | 104 | 90 | b-1′ | 0.3 | 0.935 | 10 | — | — | — | — |
| Example 12 | a-2 | 0.8 | 100 | 70 | b-1′ | 0.3 | 0.935 | 10 | b-1 | 0.8 | 0.935 | 20 |
| Example 13 | a-1 | 0.5 | 104 | 70 | b-2′ | 0.4 | 0.922 | 10 | b-3 | 1.6 | 0.956 | 20 |

| Physical Properties Evaluation Example | Inorganic Flame Retardant | | Tensile Strength (kg/mm²) Elongation (%) | Percent Heat Deformation (%) | Oxygen Index (%) | Remarks |
|---|---|---|---|---|---|---|
| | Kind | (wt. part) | | | | |
| Example 2 | Mg(OH)₂ | 100 | 1.68/710 | 18 | 27 | good flexibility |

TABLE 2-continued

|  |  |  |  |  |  |
|---|---|---|---|---|---|
| Example 12 | Mg(OH)$_2$ | 100 | 1.56/660 | 14 | 26 | " |
| Example 13 | Mg(OH)$_2$ | 100 | 1.65/660 | 8 | 27 | " |

TABLE 3

| Physical Properties Evaluation Example | (a) Copolymer of ethylene and carboxyl-containing monomer or derivative thereof | | | | (b) Modified olefin copolymer | | | | (c) Inorganic flame retardant | |
|---|---|---|---|---|---|---|---|---|---|---|
| | Kind | M I (g/10 min) | Melting Point (°C.) | Amount (wt. part) | Kind | M I (g/10 min) | Density (g/cm$^3$) | Amount (wt. part) | Kind | Amount (wt. part) |
| Example 14 | a-2 | 0.8 | 100 | 94 | b-1' | 0.3 | 0.935 | 6 | c-1 | 80 |
| Example 15 | a-2 | 0.8 | 100 | 90 | b-1' | 0.3 | 0.935 | 10 | c-1 | 50 |
| Example 16 | a-4 | 1.5 | 100 | 90 | b-1' | 0.3 | 0.935 | 10 | c-1 | 40 |
| Example 17 | a-4 | 1.5 | 100 | 85 | b-3' | 0.6 | 0.956 | 15 | c-1 | 60 |
| Example 18 | a-7 | 1.4 | 91 | 90 | b-3' | 0.6 | 0.956 | 10 | c-1 | 70 |
| Example 19 | a-2 | 0.8 | 100 | 90 | b-1' | 0.3 | 0.935 | 10 | c-1 | 80 |
| Comparative Example 7 | a-2 | 0.8 | 100 | 100 | — | — | — | — | c-1 | 80 |
| Example 8 | a-4 | 1.5 | 100 | 55 | b-1' | 0.3 | 0.935 | 45 | c-1 | 70 |
| Example 9 | a-2 | 0.8 | 100 | 90 | b-1' | 0.3 | 0.935 | 10 | c-1 | 80 |
| Example 10 | a-2 | 0.8 | 100 | 90 | b-1' | 0.3 | 0.935 | 10 | c-1 | 80 |
| Example 11 | a-2 | 0.8 | 100 | 90 | b-1' | 0.3 | 0.935 | 10 | c-1 | 15 |
| Example 12 | a-4 | 1.5 | 100 | 90 | b-1' | 0.3 | 0.935 | 10 | c-1 | 210 |
| Example 13 | a-2 | 0.8 | 100 | 90 | b-1' | 0.3 | 0.935 | 10 | c-3 | 80 |
| Example 14 | a-2 | 0.8 | 100 | 90 | b-1' | 0.3 | 0.935 | 10 | c-4 | 80 |

| Physical Properties Evaluation Example | (d) Organic flame retardant | | Sb$_2$O$_3$ (wt. part) | Physical Properties of Composition | | | |
|---|---|---|---|---|---|---|---|
| | Kind | Amount (wt. part) | | M I (g/10 min) | Tensile Strength (kg/cm$^2$) | Elongation (%) | UL-94 Test |
| Example 14 | d-1 | 20 | 10 | 0.3 | 140 | 650 | V-0 pass |
| Example 15 | d-1 | 30 | 15 | 0.25 | 155 | 700 | " |
| Example 16 | d-1 | 15 | 0.7 | 0.7 | 130 | 740 | " |
| Example 17 | d-1 | 25 | 15 | 0.5 | 120 | 700 | " |
| Example 18 | d-1 | 25 | 15 | 0.7 | 120 | 700 | " |
| Example 19 | d-2 | 20 | 10 | 0.25 | 145 | 680 | " |
| Comparative Example 7 | d-1 | 20 | 10 | 0.7 | 100 | 640 | V-1 fail |
| Example 8 | d-1 | 20 | 10 | 0.1 | 85 | 350 | V-0 pass |
| Example 9 | d-1 | 20 | 3 | 0.2 | 150 | 700 | V-1 fail |
| Example 10 | d-1 | 6 | 20 | 0.2 | 145 | 680 | " |
| Example 11 | d-1 | 20 | 10 | 0.5 | 170 | 780 | " |
| Example 12 | d-1 | 20 | 10 | 0.4 | 70 | 40 | V-0 pass |
| Example 13 | d-1 | 20 | 10 | 0.4 | 95 | 240 | V-1 fail |
| Example 14 | d-1 | 20 | 10 | 0.4 | 90 | 210 | " |

TABLE 4

| Physical Properties Evaluation Example | (a) Copolymer of ethylene and carboxyl-containing monomer or derivative thereof | | | | (b) Modified olefin copolymer | | | | (c) Inorganic flame retardant | |
|---|---|---|---|---|---|---|---|---|---|---|
| | Kind | M I (g/10 min) | Melting Point (°C.) | Amount (wt. part) | Kind | M I (g/10 min) | Density (g/cm$^3$) | Amount (wt. part) | Kind | Amount (wt. part) |
| Sample No. 1 | a-2 | 0.8 | 100 | 90 | b-1' | 0.3 | 0.935 | 10 | c-1 | 100 |
| No. 2 | a-5 | 3 | 100 | 90 | b-1' | 0.3 | 0.935 | 10 | c-1 | 100 |
| No. 3 | a-6 | 6 | 100 | 90 | b-1' | 0.3 | 0.935 | 10 | c-1 | 100 |
| No. 4 | a-2 | 0.8 | 100 | 90 | b-1' | 0.3 | 0.935 | 10 | c-1 | 60 |
| No. 5 | a-5 | 3 | 100 | 90 | b-1' | 0.3 | 0.935 | 10 | c-1 | 60 |
| No. 6 | a-6 | 6 | 100 | 90 | b-1' | 0.3 | 0.035 | 10 | c-1 | 60 |

| Physical Properties Evaluation Example | (d) Organic flame retardant | | Sb$_2$O$_3$ (wt. part) | Physical Properties of Composition | | | |
|---|---|---|---|---|---|---|---|
| | Kind | Amount (wt. part) | | Tensile Strength (kg/cm$^2$) | Elongation (%) | Oxygen Index | UL-94 Test |
| Sample No. 1 | — | — | — | 1.48 | 660 | 27 | — |
| No. 2 | — | — | — | 1.06 | 590 | 27 | — |
| No. 3 | — | — | — | 0.7 | 570 | 27 | — |
| No. 4 | d-1 | 25 | 15 | 1.49 | 690 | — | V-0 pass |
| No. 5 | d-1 | 25 | 15 | 1.02 | 680 | — | " |
| No. 6 | d-1 | 25 | 15 | 0.81 | 660 | — | " |

(Effect of the Invention)

In the flame-retardant composition of the present invention, a synergistic effect of flame retardance is enhanced by a combined use of the copolymer of ethylene and carboxyl-containing monomer or derivative thereof as component (a), and a great improvement in mechanical strength and heat resistance can be attained by incorporating therein an appropriate amount of the olefin polymer modified with unsaturated carboxylic acid or derivative thereof as component (b). Besides, since the percentage loading of the flame retardant and inorganic fillers can be enhanced, there can be obtained a low smoking, pollution-free type flame-retardant composition without evolution of a noxious gas during combustion by using a hydrate of an inorganic metallic compound as the flame retardant, e.g. aluminum hydroxide or magnesium hydroxide, thus meeting the recent needs for a higher flame retardance.

Moreover, since the composition of the present invention is superior in electrical characteristics, it can be used as an electrical material such as an electrical insulator or sheath for electric wire or cable after being crosslinked or without crosslinked. Particularly, it is suitable for those requiring a high degree of flame retardance such as cable for various power generation plants, for example, atomic energy laboratories wherein the amount of corrosive gas is specified, as well as cable for chemical, iron and steel, and petroleum plants, fireproof electric wire and general house wiring.

Further, the composition of the present invention can be applied to molding use for obtaining extruded or injection-molded products such as films, sheets and pipes, or can be utilized as a master batch. It is utilized as panels, packing materials, furniture and household utensils in such fields as fibers, electric and electronic fields, automobiles, ships, aircraft, construction and civil engineering works.

What is claimed is:

1. A flame-retardant olefin polymer composition containing 100 parts by weight of a resin component, said resin component consisting essentially of the following (a) and (b):
   (a) 60–99% by weight of a copolymer of ethylene and a carboxyl-containing monomer or derivative thereof and
   (b) 1–40% by weight of a modified olefin polymer obtained by reacting under heat conditions an ethylene homopolymer having a density of 0.88 to 0.97 g/cm$^3$ or an ethylene-α-olefin copolymer having a density of 0.88 to 0.97 g/cm$^3$ with a compound selected from the group consisting of an unsaturated carboxylic acid, an anhydride of an unsaturated carboxylic acid and an ester of an unsaturated carboxylic acid in the presence of an organic peroxide in the absence of an inorganic flame retardant; and
   (c) 20–200 parts by weight of an inorganic flame retardant.

2. A flame-retardant olefin polymer composition as set forth in claim 1, further containing:
   (d) an organic flame retardant which is a halogen-based compound and a flame retarding aid which is antimony trioxide or antimony pentoxide, said organic flame retardant and said flame retarding aid being used in the range from 5:1 to 1:3 in terms of weight ratio and the total amount of both being up to 100 parts by weight.

3. A flame-retardant olefin polymer composition as set forth in claim 1, wherein the component (a) is an ethylene-vinyl acetate copolymer or an ethylene-ethyl acrylate copolymer.

4. A flame-retardant olefin polymer composition as set forth in claim 3, wherein said ethylene-vinyl acetate copolymer or ethylene-ethyl acrylate copolymer has a melt index of 0.1 to 10 g/10 min and has a vinyl acetate or ethyl acrylate content in the range from 5 to 30% by weight.

5. A flame-retardant olefin polymer composition as set forth in claim 1, wherein said compound selected from the group consisting of an unsaturated carboxylic acid, an anhydride of an unsaturated carboxylic acid and an ester of an unsaturated carboxylic acid is added in an amount of 0.05 to 10% by weight based on the weight of the olefin polymer as the component (b).

6. A flame-retardant olefin polymer composition as set forth in claim 6, wherein said compound selected from the group consisting of an unsaturated carboxylic acid, an anhydride of an unsaturated carboxylic acid and an ester of an unsaturated carboxylic acid in the component (b) is maleic anhydride.

7. A flame-retardant olefin polymer composition as set forth in claim 1, wherein the component (c) is a hydrate of an inorganic metallic compound.

8. A flame-retardant olefin polymer composition as set forth in claim 7, wherein said inorganic metallic compound hydrate is aluminum hydroxide and/or magnesium hydroxide.

9. An electrical insulator or sheath, said electrical insulator or sheath comprising a flame-retardant olefin polymer composition containing 100 parts by weight of a resin component consisting essentially of the following (a) and (b):
   (a) 60–99% by weight of a copolymer of ethylene and a carboxyl-containing monomer or a derivative thereof and
   (b) 1–40% by weight of a modified olefin polymer obtained by reacting under heat conditions an ethylene homopolymer having a density of 0.88 to 0.97 g/cm$^3$ or an ethylene-α-olefin copolymer having a density of 0.88 to 0.97 g/cm$^3$ with a compound selected from the group consisting of an unsaturated carboxylic acid, an anhydride of an unsaturated carboxylic acid and an ester of an unsaturated carboxylic acid in the presence of an organic peroxide in the absence of an inorganic flame retardant; and
   (c) 20–200 parts by weight of an inorganic flame retardant.

10. An electrical insulator or sheath as set forth in claim 10, further containing:
    (d) an organic flame retardant which is a halogen-based compound and a flame retarding aid which is antimony trioxide or antimony pentoxide, said organic flame retardant and said flame retarding aid being used in the range from 5:1 to 1:3 in terms of weight ratio and the total amount of both being up to 100 parts by weight.

11. An electrical insulator or sheath as set forth in claim 10, wherein the component (a) is an ethylene-vinyl acetate copolymer or an ethylene-ethyl acrylate copolymer.

12. An electrical insulator or sheath as set forth in claim 12, wherein said ethylene-vinyl acetate copolymer or ethylene-ethyl acrylate copolymer has a melt index of 0.1 to 10 g/10 min and has a vinyl acetate or ethyl acrylate content in the range from 5 to 30% by weight.

13. An electrical insulator or sheath as set forth in claim 9, wherein said compound selected from the group consisting of an unsaturated carboxylic acid, an anhydride of an unsaturated carboxylic acid and an ester of an unsaturated carboxylic acid is added in an amount of 0.05 to 10% by weight based on the weight of the olefin polymer as the component (b).

14. An electrical insulator or sheath as set forth in claim 13, wherein said compound selected from the group consisting of an unsaturated carboxylic acid, an anhydride of an unsaturated carboxylic acid and an ester of an unsaturated carboxylic acid in the compound (b) is maleic anhydride.

15. An electrical insulator or sheath as set forth in claim 9, wherein the component, (c) is a hydrate of an inorganic metallic compound.

16. An electrical insulator or sheath as set forth in claim 15, wherein said inorganic metallic compound hydrate is selected from the group consisting of aluminum hydroxide, magnesium hydroxide and mixtures thereof.

17. An electrical insulator or sheath as set forth in claim 9, said electrical insulator or sheath being an insulator or sheath for electric wire or power cable.

18. An electrical insulator or sheath as set forth in claim 9, said electrical insulator or sheath being an electrical insulation protector selected from the group consisting of insulating plastic sheet, insulation coating, cable protecting cover, packing and protective pipe.

19. A method of preparing a flame retardant olefin polymer composition, said method comprising blending a 100 parts by weight of a resin component, said resin component consisting essentially of the following (a) and (b):

(a) 60–99% by weight of a copolymer of ethylene and carboxyl-containing monomer or a derivative thereof and (b) 1–40% by weight of a modified olefin polymer obtained by reacting under heat conditions an ethylene homopolymer having a density of 0.88 to 0.97 $g/cm^2$ or an ethylene-$\alpha$-olefin copolymer having a density of 0.88 to 0.97 $g/cm^2$ with a compound selected from the group consisting of an unsaturated carboxylic acid, an anhydride of an unsaturated carboxylic acid and an ester of an unsaturated carboxylic acid in the presence of an organic peroxide in the absence of an inorganic flame retardant; with (c) 20–200 parts by weight of an inorganic flame retardant.

* * * * *

UNITED STATES PATENT AND TRADEMARK OFFICE
CERTIFICATE OF CORRECTION

PATENT NO. : 4,845,146

DATED : July 4, 1989

INVENTOR(S) : Inoue et al.

It is certified that error appears in the above-identified patent and that said Letters Patent is hereby corrected as shown below:

Column 3, line 62, "it is" should read --is it--;

Column 6, line 30, "impairs" should read --impair--;

Claim 6, line 2 thereof, "6" should read --5--;

Claim 10, line 2 thereof, "10" should read --9--;

UNITED STATES PATENT AND TRADEMARK OFFICE
CERTIFICATE OF CORRECTION

PATENT NO. : 4,845,146

DATED : July 4, 1989

INVENTOR(S) : Inoue et al.

It is certified that error appears in the above-identified patent and that said Letters Patent is hereby corrected as shown below:

Claim 11, line 2 thereof, "10" should read --9--;

Claim 12, line 2 thereof, "12" should read --11--;

Claim 19, line 12 thereof, "$g/cm^2$" should read --$g/cm^3$--;

Claim 19, line 13 thereof, "$g/cm^2$" should read --$g/cm^3$--.

Signed and Sealed this

Twenty-second Day of May, 1990

Attest:

HARRY F. MANBECK, JR.

*Attesting Officer*  *Commissioner of Patents and Trademarks*